(12) United States Patent
Kron et al.

(10) Patent No.: US 7,700,510 B2
(45) Date of Patent: *Apr. 20, 2010

(54) OPTO-CERAMICS MADE FROM $IN_2O_3$ OR OXIDES Y, LU, SC, YB, IN, GD, AND LA, OPTICAL ELEMENTS MADE THEREFROM, AND MAPPING OPTICS INCLUDING THE OPTICAL ELEMENTS

(75) Inventors: Guenther Kron, Mainz (DE); Ulrich Peuchert, Bodenheim (DE); Joseph S. Hayden, Clarks Summit, PA (US); Carsten Weinhold, Scranton, PA (US); Yvonne Menke, Mainz (DE); Yoshio Okano, Mainz (DE)

(73) Assignee: Schott AG, Mainz (DE)

( * ) Notice: Subject to any disclaimer, the term of this patent is extended or adjusted under 35 U.S.C. 154(b) by 224 days.

This patent is subject to a terminal disclaimer.

(21) Appl. No.: 11/761,766

(22) Filed: Jun. 12, 2007

(65) Prior Publication Data
US 2007/0291378 A1 Dec. 20, 2007

(30) Foreign Application Priority Data
Jun. 14, 2006 (DE) .................. 10 2006 027 958

(51) Int. Cl.
- *C04B 35/50* (2006.01)
- *C04B 35/505* (2006.01)
- *G02B 1/02* (2006.01)
- *G02B 3/00* (2006.01)

(52) U.S. Cl. ....................... 501/152; 359/642
(58) Field of Classification Search ............... 501/152; 359/642

See application file for complete search history.

(56) References Cited

U.S. PATENT DOCUMENTS
3,432,314 A  3/1969  Mazdiyasni et al.

(Continued)

FOREIGN PATENT DOCUMENTS
CN  1660716  8/2005

(Continued)

OTHER PUBLICATIONS

"The Properties of Optical Glass"; Hans Bach, Norbert Neuroth (eds.), Berlin (I.A.): Springer, 1995.- (Schott Series on Glass and Glass Ceramics: Science, Technology, and Applications; 1); XVII, pp. 410-412., Corr. Print. 1998, XVII, p. 414.

(Continued)

*Primary Examiner*—Karl E Group
(74) *Attorney, Agent, or Firm*—Michael J. Striker

(57) ABSTRACT

The opto-ceramics and optical elements of the present invention are transmissive to visible light and/or to infrared radiation. They consist of a crystal combination in which individual crystallites have a cubic structure of the type $Y_2O_3$ and are made from $In_2O_3$ or a mixture of oxides of the type $X_2O_3$ in which X=Y, Lu, Sc, Yb, In, Gd, or La. Also mixtures of $X_2O_3$ with oxides having different stoichiometries, such as zirconium and hafnium oxide, are possible, as long as the cubic structure of the opto-ceramic is maintained. The optical elements prepared from the opto-ceramics are particularly suitable for mapping optics, such as objectives having reduced chromatic aberrations, in particular with approximately apochromatic mapping behavior. The optical elements of the present invention may be used in lens systems in combination with lenses of glass, but also with other ceramic lenses.

24 Claims, 6 Drawing Sheets

U.S. PATENT DOCUMENTS

| | | | |
|---|---|---|---|
| 3,545,987 A | | 12/1970 | Anderson |
| 3,640,887 A | | 2/1972 | Anderson |
| 4,098,612 A | | 7/1978 | Rhodes et al. |
| 4,115,134 A | * | 9/1978 | Rhodes .................. 501/152 |
| 4,147,744 A | | 4/1979 | Rhodes |
| 4,421,671 A | * | 12/1983 | Cusano et al. ........ 252/301.4 F |
| 4,466,930 A | * | 8/1984 | Greskovich et al. ........ 264/1.22 |
| 4,473,513 A | * | 9/1984 | Cusano et al. ............ 264/1.22 |
| 4,518,545 A | | 5/1985 | Cusano et al. |
| 4,571,312 A | * | 2/1986 | Greskovich et al. ........ 264/1.22 |
| 4,747,973 A | * | 5/1988 | Cusano et al. ........ 252/301.4 R |
| 4,755,492 A | | 7/1988 | Greskovich et al. |
| 4,761,390 A | | 8/1988 | Hartnett et al. |
| 5,100,598 A | * | 3/1992 | Dole et al. ................. 264/1.22 |
| 5,116,559 A | * | 5/1992 | Dole et al. ................. 264/1.22 |
| 5,521,387 A | * | 5/1996 | Riedner et al. ............. 250/367 |
| 6,825,144 B2 | | 11/2004 | Hideki et al. ............... 501/152 |
| 6,908,872 B2 | | 6/2005 | Tanaka et al. |
| 6,989,930 B2 | | 1/2006 | Shinoda |
| 7,258,707 B2 | * | 8/2007 | Celikkaya et al. ............. 51/307 |
| 7,286,297 B2 | * | 10/2007 | Kawakami ................... 359/642 |
| 7,329,370 B2 | * | 2/2008 | Kim et al. ............. 252/301.4 R |
| 7,597,866 B2 | * | 10/2009 | Hosokawa et al. ......... 423/263 |
| 2006/0012885 A1 | | 1/2006 | Beder et al. |
| 2006/0061880 A1 | | 3/2006 | Kawakami |
| 2006/0062569 A1 | | 3/2006 | Sato |
| 2008/0094734 A1 | * | 4/2008 | Zimmer et al. .............. 359/796 |

FOREIGN PATENT DOCUMENTS

| | | | |
|---|---|---|---|
| CN | 1760157 | | 4/2006 |
| EP | 0 263 662 | | 4/1988 |
| EP | 0 277 811 | | 8/1988 |
| EP | 1 775 273 | | 4/2007 |
| GB | 1202032 | | 8/1970 |
| JP | 06211573 | | 8/1994 |
| JP | 08/13140 | | 1/1996 |
| JP | 2000-203933 | | 7/2000 |
| JP | 2003-128465 | | 5/2003 |
| JP | 2006-91430 | | 4/2006 |
| JP | 2006-91482 | | 4/2006 |
| WO | 2006/003726 | | 1/2006 |
| WO | 2006003726 | * | 1/2006 |

OTHER PUBLICATIONS

J. Mouzon, "Synthesis of Yb:Y2O3 Nanoparticles and Fabrication of Transparent Polycrystalline Yytia Ceramic." Lulea University of Technology, Int. No. 2005: 29, ISSN: I405-I757/ ISRN: LIU-0529-SE.
TIF2-533460, 1996.
TIF1-511510, 1996.
Data Sheet N-BAF10 670471.375, Feb. 19, 2002.
Data Sheet N-SSK8 618498.327, Sep. 3, 2001.
Data Sheet N-SSK5 658509.371, Sep. 3, 2001.
Data Sheet N-KF9 523515.250, Sep. 3, 2001.
Data Sheet LLF1 548458.294, Feb. 2, 2004.
Data Sheet N-BAF4 606437.289, Sep. 3, 2001.

* cited by examiner

....... 0 MOLE% La$_2$O$_3$
— — — 0.7 MOLE% La$_2$O$_3$
———— 10.5 MOLE% La$_2$O$_3$

OPTO-CERAMICS MADE FROM IN$_2$O$_3$ OR OXIDES Y, LU, SC, YB, IN, GD, AND LA, OPTICAL ELEMENTS MADE THEREFROM, AND MAPPING OPTICS INCLUDING THE OPTICAL ELEMENTS

CROSS-REFERENCE

The disclosure in German Patent Application DE 10 2006 027 958.1-51 of Jun. 14, 2006 is explicitly incorporated here by reference. This German Patent Application also describes the same invention that is disclosed here and provides the basis for a claim of priority for the instant invention under 35 U.S.C. 119.

BACKGROUND OF THE INVENTION

1. The Field of the Invention

The present invention relates to opto-ceramics and refractive, transmissive or diffractive optical elements prepared from them. The opto-ceramics and optical elements are transmissive for visible light and/or for infrared radiation. The opto-ceramics consist of a crystal combination in which the single crystallites have a cubic structure of the type Y$_2$O$_3$, comprising alternatively the oxide In$_2$O$_3$ or a mixture of two or more oxides of the type X$_2$O$_3$, wherein X is selected from the group consisting of Y, Lu, Sc, Yb, In, Gd and La.

Also mixtures of X$_2$O$_3$ with oxides having a different stoichiometry, such as zirconium and hafnium oxide, are possible, as long as the cubic structure of the opto-ceramic is maintained.

In the following the ceramic is also referred to as an opto-ceramic. According to the present invention, an opto-ceramic (or ceramic) is, as mentioned above, a highly transparent, polycrystalline single-phase material comprising an oxide. Opto-ceramics are to be understood as a particular subgroup of ceramics. "Single phase" means that more than 95% by weight, preferably at least 97% by weight, more preferably 99% by weight, and most preferred 99.5 to 99.9% by weight are in the crystalline form of the intended composition.

The optical elements, which may be prepared from the opto-ceramics, are particularly suitable for use in mapping optics, for example objectives having reduced chromatic aberrations, in particular with approximately apochromatic mapping behavior. The optical elements made of transparent ceramic may be used in lens systems in combination with lenses of glass, but also with other ceramic lenses, in particular also in digital cameras, mobile phone cameras, in the field of microscopy, microlithography, optical data storage or other applications in the field of consumer or industrial applications.

2. The Related Art

The main aim in the development of mapping optics is to attain sufficient optical quality with a compact optical set-up, which is as lightweight as possible. In particular for applications in the field of digital image detection in electronic apparatuses, such as digital cameras, objectives of mobile phones and the like, the mapping optic has to be constructed very small and lightweight. In other words, the total amount of mapping lenses must be minimal. This requires transparent materials with high refractive index and a dispersion which is as low as possible to thus allow the design of very compact mapping optics having approximately apochromatic mapping behavior.

In the case of microscopy, nearly diffraction-limited mapping optics is necessary for the ocular as well as the objective.

In the field of defense, transparent optics are required which have high transmittance in the visible (380 to 800 nm) and also in the infrared spectral range up to 8,000 nm, ideally up to 10,000 nm and, in addition, which are resistant against influences from outside, such as mechanical action, shock, temperature, change of temperature, pressure etc.

For many other technologies the same applies, for example for digital projection and for display techniques. But also in predominantly monochromatic applications, such as the optical storage technologies, compact systems can be realized by means of materials having high refractive index.

At the moment, the development of mapping optics is limited by the optical parameters of the available materials. By the available techniques of glass melting and glass forming, only such kinds of glasses having high quality can be produced which are below a line which approximately passes through the points defined by Abbe number=80/refractive index=1.7 and by Abbe number=10/refractive index=2.0 in an Abbe diagram plotting the refractive index against the Abbe number. This imaginary line is shown in FIG. 2a by a dotted line. In more detail, glasses having a refractive index of between about 1.9 and about 2.2 and an Abbe number in a range of between about 30 and 40 tend to be unstable, so that it is very difficult to produce such glasses in large amounts and with sufficient quality. Also glasses having a refractive index of between about 1.8 and about 2.1 and an Abbe number in a range of between about 30 and 45 tend to be unstable.

The definitions of refractive index (refractive number) $n_d$, Abbe number $v_d$ and relative partial dispersion (for example $P_{g,F}$) are in principle well known for a person skilled in the art and are defined and described in more detail in specialized literature in the prior art. In the sense of the present invention, the terms are used according to the definitions in "The Properties of Optical Glass"; Hans Bach, Norbert Neuroth (Eds.), Berlin (i.a.): Springer, 1995.—(Schott series on Glass and Glass ceramics: Science, Technology, and Applications; 1); XVII, p. 410-2., corr. print. 1998, XVII, p. 414.

In addition to refractive index and Abbe number, the relative partial dispersion plays an important role in the selection of an optical material. If it is desired to prepare approximately apochromatic optics, materials having approximately the same relative partial dispersion, but a high difference in the Abbe number must be combined. If the partial dispersion $P_{g,F}$ is plotted against the Abbe number (FIG. 2b), most glasses are on one line (the "normal line"). Therefore materials are desired having behavior with a different combination of Abbe number and relative partial dispersion.

At the moment materials, which are above the before mentioned imaginary line in an Abbe diagram, are exclusively single crystals or polycrystalline materials. However, the production of single crystals by means of the known crystal drawing processes is extremely costly and has enormous limitations with respect to chemical composition. Furthermore for most applications crystals cannot be produced close to the final format, so that this results in an enormous effort of post-processing. Although polycrystalline ceramics can be produced within a broader range of compositions, normally they have insufficient optical qualities, in particular with respect to the homogeneity of the refractive index and the transparency. Till today, only few ranges of compositions and structure types are known, in which transparent ceramics having sufficient optical quality can be produced.

Therefore, polycrystalline ceramics have only been used to a limited extent in optical applications till today. Thus for example, the Japanese Patent Publication JP 2000-203933 discloses production of polycrystalline YAG by means of a special sintering process. Recently, also the production of polycrystalline YAG of optical quality as a laser host material has been achieved, for example for doping with laser-active ions, for example Nd.

In U.S. Pat. No. 6,908,872 translucent ceramics are described which use barium oxide as an oxide, which has to be present in the ceramic. The thus obtained ceramics have a perovskite structure and are para-electric. However, ceramics containing such barium-containing phases having perovskite structure often have insufficient optical mapping quality. This is a result of the tendency of many perovskites to form distorted ferro-electric crystal structures and thus to loose their optical isotropy. Inter alia, this results in undesired double refraction of the crystals, from which the ceramic is built, and, in addition, the transmittance in the range of blue light (about 380 nm) is insufficient.

U.S. Pat. No. 3,640,887 describes production of opto-ceramics on the basis of cubic oxides of the stoichiometry $X_2O_3$ ("sesquioxides"). In an exemplary way, only optically active oxides are mentioned which are colored because of absorption bands in the visible (wavelengths of ca. 380 nm to 800 nm). As a sintering aid, i.a., $ThO_2$ is used. This one is not desired due to toxicity, respectively radioactivity. The like belongs to U.S. Pat. No. 3,545,987.

U.S. Pat. No. 4,761,390 discloses a cover plate that substantially consists of a $Y_2O_3$ ceramic.

Also U.S. Pat. No. 4,755,492 describes a transparent ceramic $Y_2O_3$ as well as its production from powders, which are produced by oxalate precipitation processes. The applications relate to discharge vessels for high-pressure discharge lamps.

U.S. Pat. No. 4,098,612 describe transparent ceramics of mixed oxides of $Y_2O_3$ and $Al_2O_3$ for discharge vessels. $Al_2O_3$ may be contained in an amount of up to 5% by weight, which results in the absence of a cubic structure. The like belongs to transparent ceramic $Y_2O_3$ having high contents of $La_2O_3$ from U.S. Pat. No. 4,147,744. U.S. Pat. No. 4,571,312 and U.S. Pat. No. 4,747,973 describe opto-ceramics of the system $Y_2O_3$—$Gd_2O_3$ which, doped with lanthanides that are optically active in the UV-VIS (ultraviolet-visible range), are used as optically active scintillation materials for medical techniques.

JP 2003-128465 and WO 06/03726 describe production of opto-ceramics on the basis of $Sc_2O_3$ and $Lu_2O_3$. To them are added optically active additives and thus, they are of interest for laser systems.

US 2006/061880 and US 2006/062569 describe the combination of optical mapping systems consisting of at least one lens of ceramic and additional lenticular components of glass, but advantageous effects of the ceramic (owing to e.g. a convenient dispersion behavior) for the whole system is not mentioned. The ceramic lens with extremely high refractive index ($n_d$=2.08) is in direct contact with a glass lens ($n_d$=1.62). Particularly thus costly measures have to be taken to avoid the problem of light scattering associated with the high difference in $n_d$. Thus e.g. in US 2006/062569, the ceramic lens must be connected with a glass lens, the light scattering must be reduced and distributed homogenously over the image detector by a special arrangement of this glass-ceramic-putty member in the optical mapping system.

SUMMARY OF THE INVENTION

The object of the present invention is to provide a material having a high refractive index, a high Abbe number and/or an excellent, special relative partial dispersion, which parameters cannot be achieved with conventional glass, single crystal or polycrystalline ceramic materials. According to a further aspect of the present invention, an optical component made from this improved material is provided. According to an additional aspect of the present invention, a mapping optic with an optical element that is made from this improved material is provided. According to a further aspect of the present invention, in particular a mapping optic with approximately apochromatic mapping behavior is provided. According to another aspect of the present invention, optical components having high transparency in the visible and/or infrared wavelength region are provided. Preferably, the optical components are transmissive (transparent) for both, visible light and also infrared radiation.

Transparency in the visible means an internal transmittance (i.e. the light transmittance minus reflection losses) which is, within a window having a width of at least 200 nm, for example within a window of 400 to 600 nm, a window of 450 to 750 nm or preferably a window of 400 to 800 nm, in the range of the visible light having wavelengths of 380 nm to 800 nm, higher than 70%, preferably >80%, more preferably >90%, particularly preferably >95%, at a layer thickness of 2 mm, preferably even at a layer thickness of 3 mm, particularly preferably at a layer thickness of 5 mm.

Transparency in the infrared means the internal transmittance (i.e. the light transmittance minus reflection losses) which is, within a window having a width of at least 1,000 nm, for example within a window of 1,000 to 2,000 nm, a window of 1,500 to 2,500 nm or preferably a window of 3,000 to 4,000 nm, in the range of the infrared light having wavelengths of 800 nm to 5,000 nm, higher than 70%, preferably higher than 80%, more preferably higher than 90%, particularly preferably higher than 95%, at a layer thickness of 2 mm, preferably even at a layer thickness of 3 mm, particularly preferably at a layer thickness of 5 mm.

Ideally, the material has a transmittance (incl. reflection losses) of more than 20% within a window of wavelengths with a width of more than 200 nm between 5,000 nm and 8,000 nm at a thickness of 3 mm.

These objects and others, which will be made more apparent hereinafter, are attained in an opto-ceramic material that is transparent to visible light and/or to infrared radiation, that consists of a crystal combination in which the single crystallites have a cubic structure of the type $Y_2O_3$, and that comprises $In_2O_3$ or alternatively a mixture of two or more oxides of the type $X_2O_3$ with X selected from the group consisting of Y, Lu, Sc, Yb, In, Gd and La.

The present invention also includes optical elements made from the above-described opto-ceramic material.

Additional advantageous embodiments are described and claimed in the dependent claims appended herein below.

The opto-ceramics according to the present invention are prepared by sintering at least one oxide or a mixture of oxides of the type $X_2O_3$. In so far as the oxide is in pure form, X is In.

If a mixture of two or more oxides of the type $X_2O_3$ is present, X is selected from the group consisting of Y, Lu, Sc, Yb, In, Gd and La. In this case it is essential that the ratios of the components of the mixture are chosen so that the cubic structure type of the type $Y_2O_3$ is maintained. In the sense of the present invention a ceramic having cubic structure means a ceramic that consists of a crystal combination in which the individual crystallites have cubic structure. Preferably the material consists of a cubic phase of more than 95%, further preferably >98%, even more preferably >99%.

Mixtures of the oxides of the type $X_2O_3$ with other oxides of other stoichiometries, such as zirconium oxide and hafnium oxide, are also suitable as materials for the opto-ceramics according to the present invention. The amounts of the additives $ZrO_2$ and $HfO_2$ are chosen so that the cubic structure of the type $Y_2O_3$ of the ceramic is maintained. Preferably, the cubic crystals are packed as densely as possible in a structure without defects.

All mixed crystal phases have a cubic crystal structure, which is isotypic to that of pure $Y_2O_3$.

As mentioned above, the present invention also comprises pure oxides of the type $X_2O_3$, which have a cubic crystal structure analogous to that of $Y_2O_3$, namely $In_2O_3$ and $Yb_2O_3$.

The crystallites, from which the polycrystalline opto-ceramics are made, have cubic crystal structure. This results in isotropic optical behavior without double refraction. They have dielectric behavior, i.e. because of their cubic structure there are no permanent dipoles and the material has the property of optical isotropy. The single crystallites are, as mentioned above, packed as densely as possible. Theoretical densities of at least 99%, preferably at least 99.9%, and more preferably at least 99.99%, can be achieved. Hence, the ceramics according to the invention (opto-ceramics) nearly do not comprise any pores.

According to a further aspect of the present invention which may also be independently claimed, a mapping optic with lenses of at least two different transparent materials is provided, in which at least one lens consists of an optical ceramic that is formed from the material described above. Therefore, the invention is based on the finding that novel mapping properties can be provided by the use of two different transparent materials in one mapping optic, such as an objective. In particular, one aspect is also the possibility of achromatization of the mapping optic with a relatively low number of refractive optical elements, which cannot be accomplished with known kinds of glass. For example in this case, there is contemplated the use of only three refractive optical elements in total for forming an objective having approximately apochromatic mapping properties. Overall, according to the present invention compact mapping optics having very low weight, low construction depth and with low costs for color correction compared to the multi-lens systems according to the prior art may thus be achieved.

In this case, according to a further aspect of the present invention the lenses may have purely refractive behavior. The lenses may be arranged singly or with distances between them. A few of the lenses may in principle also be assembled into a group of lenses, for example as a duplet of lenses, triplet of lenses etc.

According to a further alternative aspect of the present invention, at least one of the lenses may also have diffractive structures which are for example stamped and/or pressed onto or written into the surface of the lens or a volume of the lens, for example in the form of Fresnel zone plates, diffraction gratings and also blazed diffraction gratings.

According to a further preferred embodiment the mapping optic comprises at least one lens of a glass. Thus the mapping optic comprises a lens of the transparent opto-ceramic as described above, and a lens of a glass which is adjusted to that opto-ceramic lens.

According to a further aspect of the present invention the respective relative partial dispersions ($P_{g,F}$) of the glass and of the ceramic are approximately similar to one another; preferably the difference between them is less than about 10%, and the difference of the Abbe numbers of the glass and of the ceramic is greater than 10, preferably greater than 20. Approximately apochromatic mapping properties of the mapping optic may be achieved by simultaneously providing a comparatively high difference between the Abbe numbers with substantially identical relative partial dispersions.

BRIEF DESCRIPTION OF THE DRAWING

In the following description of preferred embodiments, from which further features, advantages, and objects to be attained follow, the invention is described in an exemplary manner with reference to the accompanying figures in which.

DESCRIPTION OF THE PREFERRED EMBODIMENTS

Figure 1:
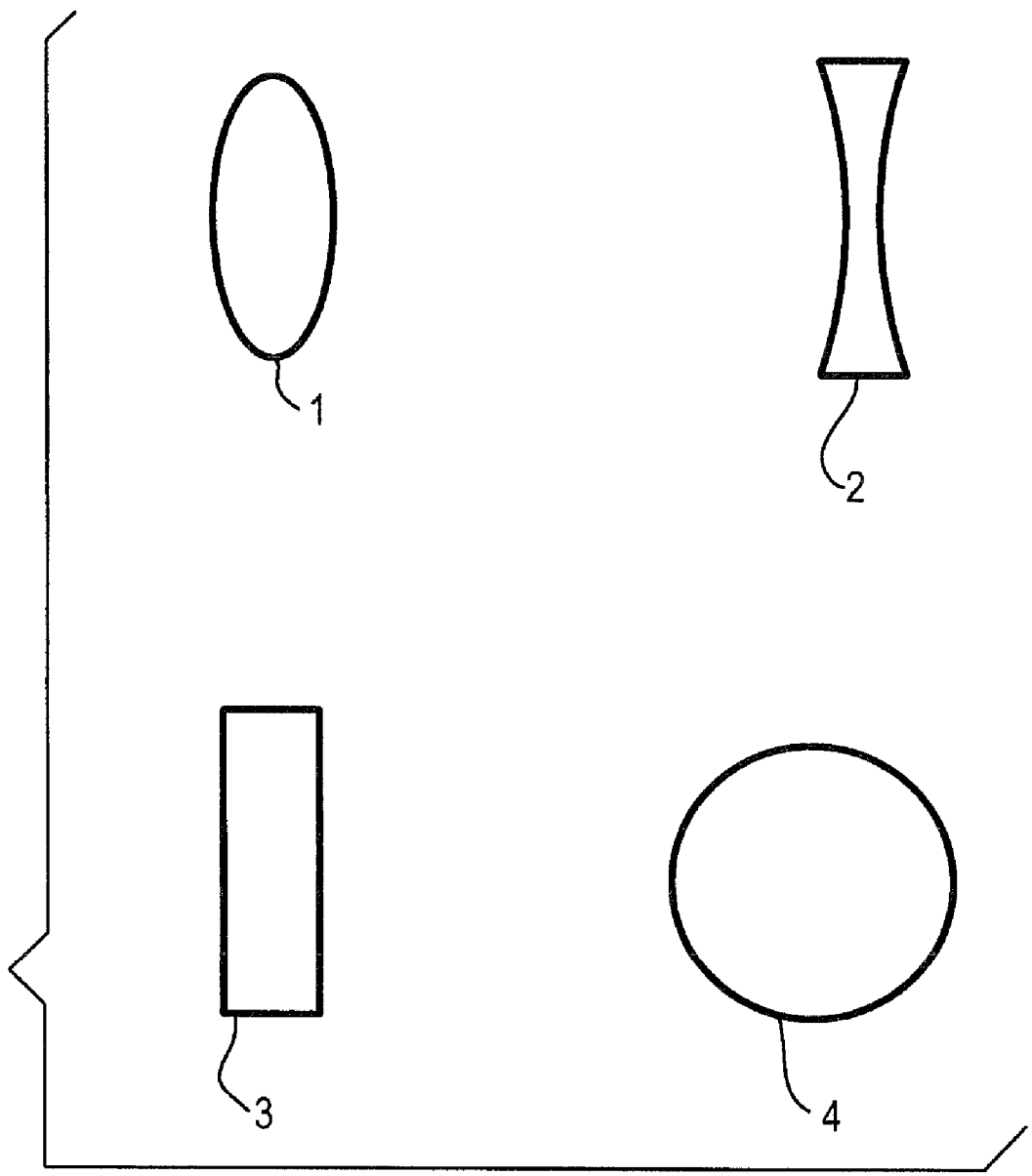
FIG. 1 shows four examples of optical elements according to the present invention.
Figure 2A:
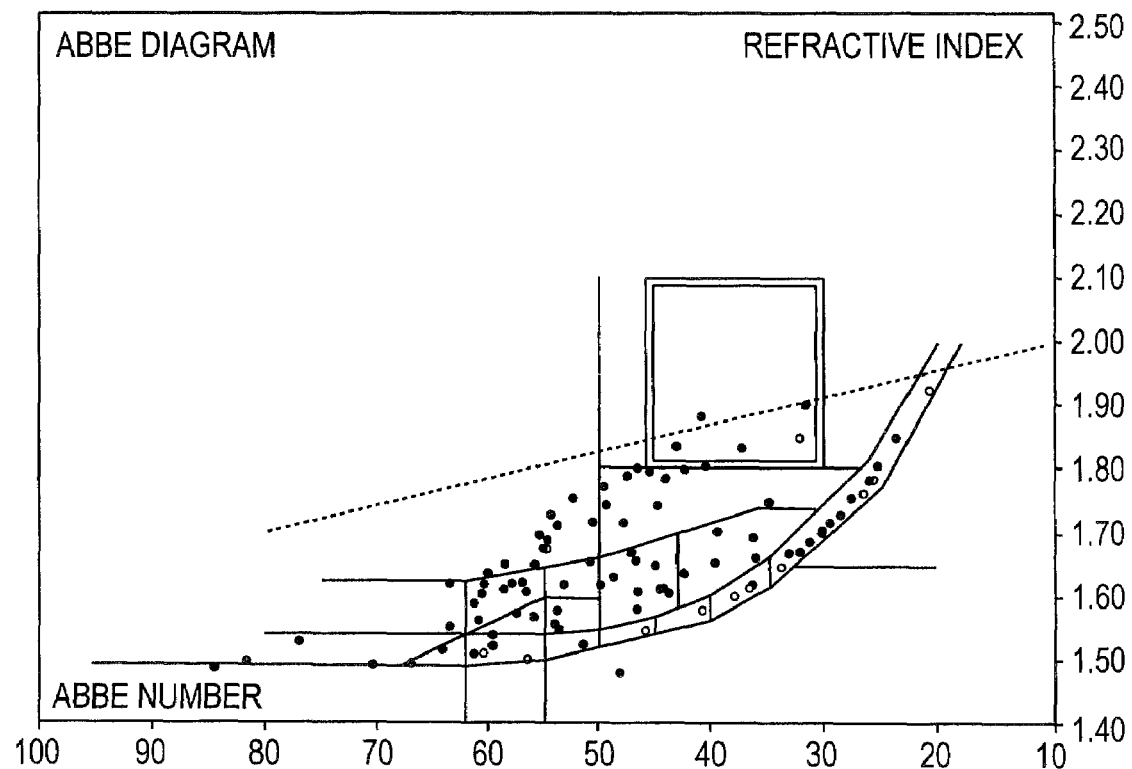
FIG. 2a is an Abbe diagram showing the properties of different glasses and opto-ceramics according to the present invention (Abbe number vs. refractive index)

In the Abbe diagram according to FIG. 2a, points marked with a circular symbol represent in an exemplary way various kinds of glasses that can be prepared in high optical quality by the glass melt techniques which are available today. As is clearly obvious from FIG. 2a, with the present techniques of glass melting and glass forming glasses that are above the dotted line that passes through the points Abbe number=80/refractive index=1.7 and Abbe number=10/refractive index=2.0 can only be produced with limitations. In particular, glasses having a refractive index in the range of between 1.80 and 2.1 in combination with an Abbe number of between about 30 and 45 are unstable (see rectangle in FIG. 2a).

Figure 2B:
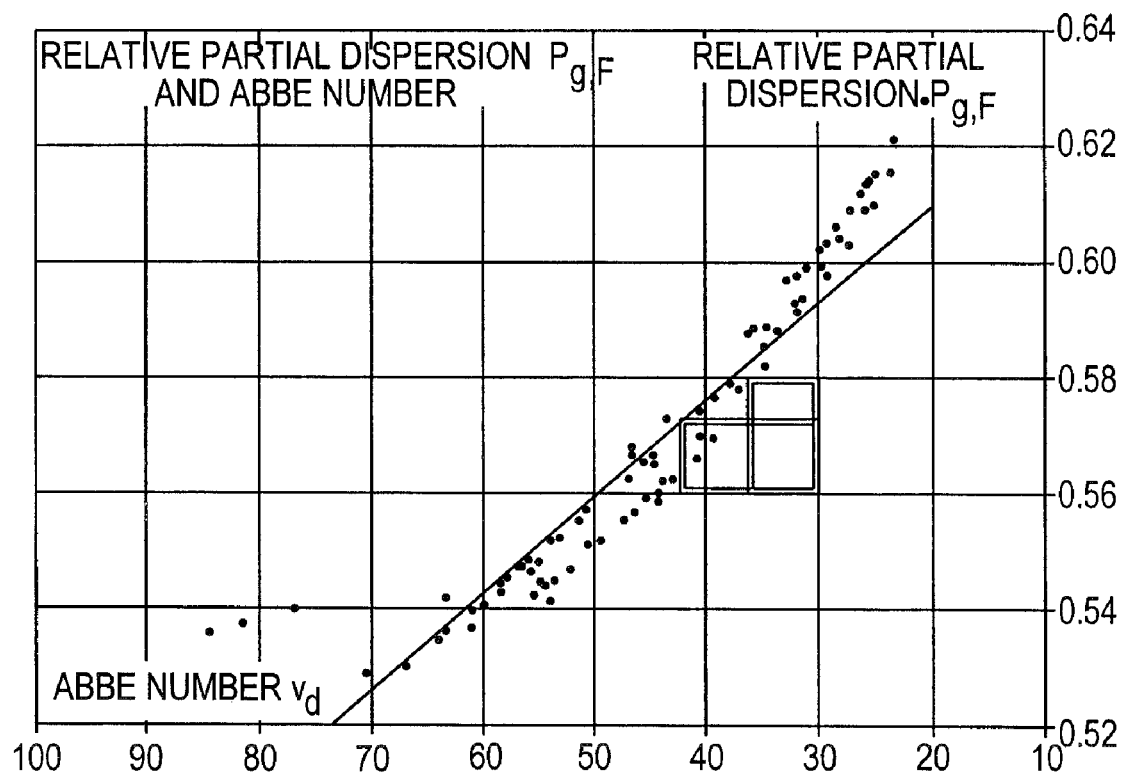
FIG. 2b is a graphical illustration showing the relationship of the positions of glasses and opto-ceramics according to the present invention (relative partial dispersion vs. Abbe number)

In the diagram according to FIG. 2b, the Abbe number of various glasses and single crystalline materials are plotted against the relative partial dispersion, $P_{g,F}$. As can be clearly seen in FIG. 2b, the combination of an Abbe number of between about 30 and 42 and a relative partial dispersion of between about 0.56 and 0.58 cannot be achieved with glasses (see rectangle in FIG. 2b).

As set forth below in more detail, according to the present invention opto-ceramics with Abbe numbers and relative partial dispersions in the above-mentioned parameter ranges that are inaccessible with glass can be produced. This provides the possibility of using novel material combinations for achromatization and/or apochromatization of lens systems with the opto-ceramics according to the present invention, which can then be used to form optical elements with novel properties.

Within the composition range, different excellent mixtures of the oxides form cubic phases, which are particularly suitable for production of opto-ceramics according to the present invention. So for example, mixtures of at least two oxides of the type $X_2O_3$ in which X is selected from the group consisting of Y, Lu, Sc, Yb, In, Gd and La, have good properties.

Preferred mixtures are mixtures of yttrium oxide with lutetium oxide, of yttrium oxide with scandium oxide, of yttrium oxide with indium oxide, of lutetium oxide with scandium oxide, of lutetium oxide with ytterbium oxide, of lutetium oxide with indium oxide, of lutetium oxide with gadolinium oxide, of lutetium oxide with lanthanum oxide, of scandium oxide with ytterbium oxide, of scandium oxide with indium oxide, of scandium oxide with gadolinium oxide, of scandium oxide with lanthanum oxide, of ytterbium oxide with indium oxide, of ytterbium oxide with gadolinium oxide, of ytterbium oxide with lanthanum oxide, of indium oxide with gadolinium oxide, of indium oxide with lanthanum oxide, of yttrium oxide with ytterbium oxide in which ytterbium oxide is present in an amount of higher than 20% by mol, of yttrium oxide with gadolinium oxide in which gadolinium oxide is present in an amount of higher than 20% by mol, and of yttrium oxide with lanthanum oxide in which lanthanum oxide is present in an amount of higher than 10% by mol.

More preferred mixtures are mixtures of yttrium oxide with scandium oxide, of yttrium oxide with indium oxide, of lutetium oxide with scandium oxide, of lutetium oxide with indium oxide, of lutetium oxide with gadolinium oxide, of lutetium oxide with lanthanum oxide, of scandium oxide with ytterbium oxide, of scandium oxide with indium oxide, of scandium oxide with gadolinium oxide, of scandium oxide with lanthanum oxide, of ytterbium oxide with indium oxide, of ytterbium oxide with gadolinium oxide, of ytterbium oxide with lanthanum oxide, of indium oxide with gadolinium oxide, of indium oxide with lanthanum oxide, of yttrium oxide with gadolinium oxide in which gadolinium oxide is present in an amount of higher than 20% by mol, and of yttrium oxide with lanthanum oxide in which lanthanum oxide is present in an amount of higher than 10% by mol.

The proportions of the amounts of the individual oxides used in the opto-ceramic material depend on the stability of the basic cubic phase. So for example $Gd_2O_3$ can be doped into $Yb_2O_3$ or $Lu_2O_3$ in a maximum amount of ca. 80% by mol, but into $Y_2O_3$ in a maximum amount of only up to ca. 70% by mol. When amounts above these limits are added, the crystal structure is located in a monoclinic crystal system with low symmetry, which is not desired according to the invention. $La_2O_3$ can be doped into $Yb_2O_3$, $Lu_2O_3$, or $Y_2O_3$ in a maximum amount of 20% by mol. Also oxides of other stoichiometries (such as zirconium and hafnium oxide) can be added, as long as the cubic structure is maintained.

Oxide mixtures of each of the following combination of elements are preferably used for the opto-ceramics according to the present invention:

Y—Lu, Y—Sc, Y—In;
Lu—Sc, Lu—Yb, Lu—In, Lu—Gd, Lu—La;
Sc—Yb, Sc—In, Sc—Gd, Sc—La;
Yb—In, Yb—Gd, Yb—La; and
In—Gd, In—La.

Mixtures of yttrium oxide with ytterbium oxide, in which ytterbium oxide is present in an amount of higher than 20% by mol, preferably higher than 30% by mol, and further preferably higher than 40% by mol, are also possible. Mixtures of yttrium oxide with gadolinium oxide, in which gadolinium oxide is present in an amount of higher than 20% by mol, preferably higher than 30% by mol, and further preferably higher than 40% by mol are also possible. Mixtures of yttrium oxide with lanthanum oxide, in which lanthanum oxide is present in an amount of higher than 10% by mol and preferably higher than 20% by mol are also possible.

The oxides that can be used according to the present invention form compounds that normally do not have any optical activity in the visible spectral range, i.e. at ca. 380 to 800 nm, i.e. light in this wavelength range is neither absorbed nor emitted. Substantially, the ceramics are not colored; no fluorescence is present in this case.

For a series of passive optical elements, possible fluorescence has to be suppressed in a targeted way. This can be guaranteed by the use of raw materials with especially high purity. According to one embodiment, the content of optically active impurities (for example active ions of the group of rare earths or transition metals) has to be reduced to a minimum. Preferably, this is <100 ppm, preferably <10 ppm, particularly preferably <1 ppm and most preferably, the opto-ceramics are free of these ions, such as Pr, Nd, Sm, Eu, Tb, Dy, Ho, Er, Tm.

According to a further embodiment of the present invention, these ions may be added in amounts such that the optical activity (efficiency of laser action) is strongly impaired, which applies to amounts of 15% by mol or higher.

A prerequisite for that is that for the particular application self-color or fluorescence does not play a role. As long as this is the case, also further elemental oxides of the lanthanide series may be used. For example, $Tb_2O_3$, $Dy_2O_3$, $Er_2O_3$, $Ho_2O_3$ and $Tm_2O_3$ may be added. The last mentioned oxides also form cubic crystalline phases as pure oxides.

$ZrO_2$ or $HfO_2$ may be added in definite amounts to the above-mentioned oxides and/or oxide mixtures. For example, these amounts are up to 50% by mol of $HfO_2$ or $ZrO_2$ in $Yb_2O_3$ or $Lu_2O_3$ and up to 40% by mol of $HfO_2$ or $ZrO_2$ in $Sc_2O_3$ or $Y_2O_3$. Generally, the content of $ZrO_2$ should not exceed 55% by mol.

$HfO_2$ is possible as raw material, e.g. incorporated via $ZrO_2$. $ThO_2$ is not suitable, because of its toxicity and radioactivity.

The refractive index is noticeably increased by the use of $HfO_2$ and/or $ZrO_2$.

Preferably, the refractive indices of the opto-ceramics according to the present invention are in a range from 1.80 to 2.1, more preferably from 1.85 to 2.05 and particularly preferably from 1.89 to 2.02. The Abbe number is between 30 and 45, preferably 33 to 40. The relative partial dispersion ($P_{g,F}$) is in a range from 0.560 to 0.580, preferably from 0.565 to 0.575.

Figure 3:
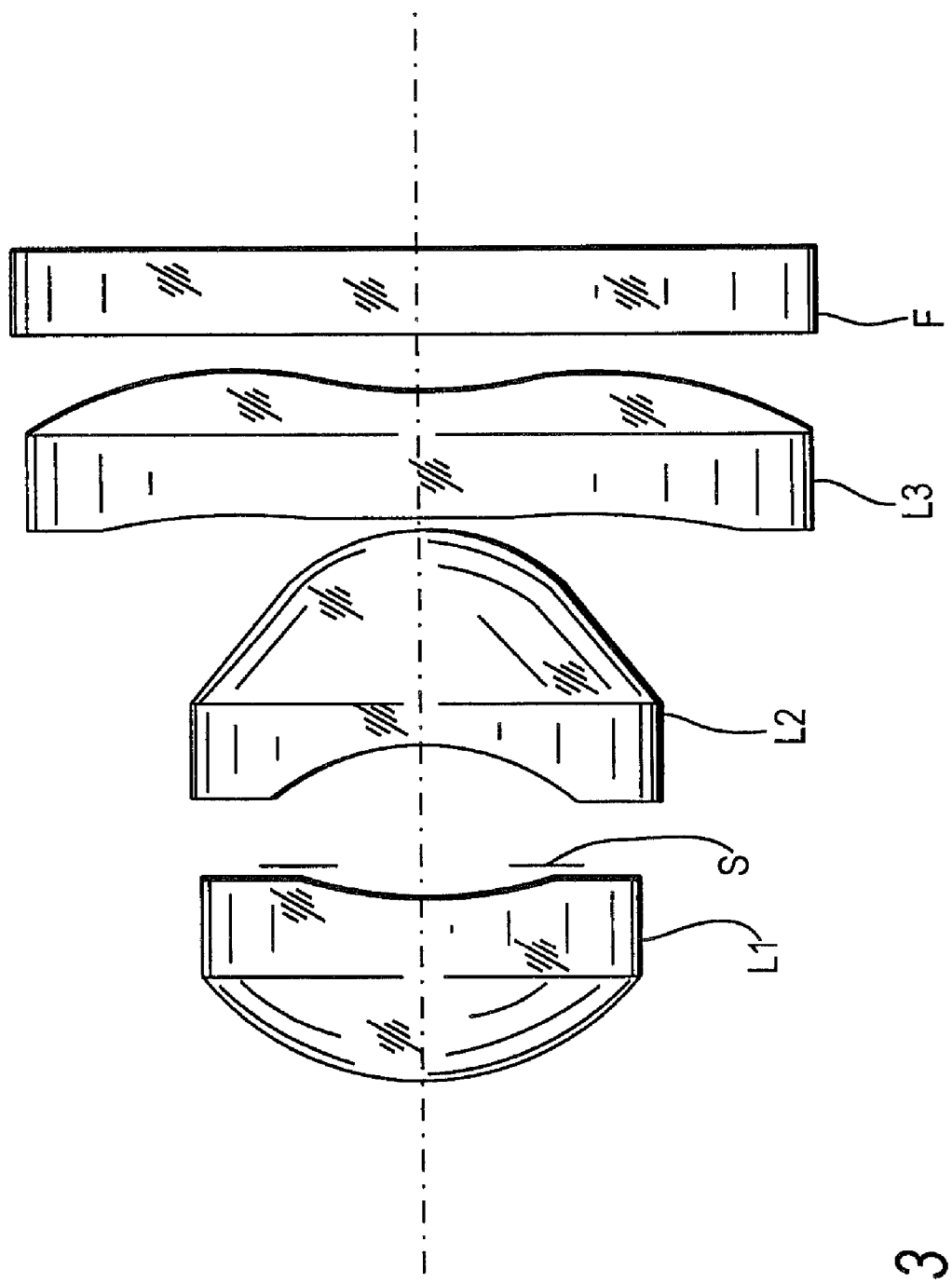
FIG. 3 is a cross-sectional view of a mapping optic according to the present invention.

FIG. 3 shows a group of lenses, which can for example be inserted into a compact objective of an electronic apparatus, such as a mobile phone. According to FIG. 3, the group of lenses comprises, from a side of the object to be observed or imaged, a first lens L1, a lens aperture stop S, a second lens L2 and a third lens L3. Lens L1 has a positive refractive power and its convex surface is oriented toward the object to be imaged. The meniscus-shaped second lens L2 has a positive refractive power and its convex surface is oriented toward the object to be imaged. The third lens L3 has a negative refractive power and its concave surface is oriented toward the object to be imaged. The lens aperture stop S is arranged between the first lens L1 and the second lens L2 and substantially defines together with the focal length of the objective the F-number of the objective.

Figure 4:
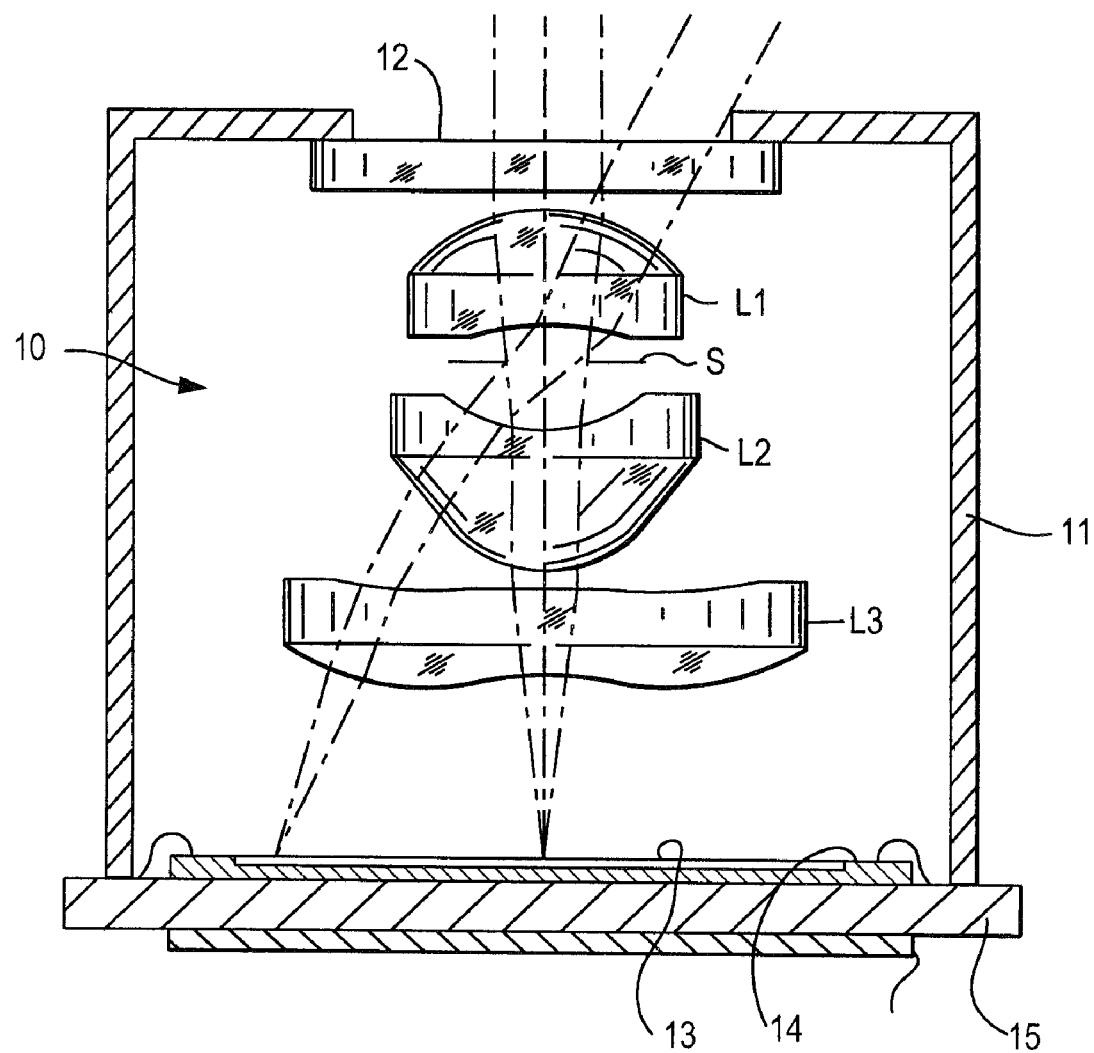
FIG. 4 is a cross-sectional view of a compact image detection device with the mapping optic according to FIG. 3.

FIG. 4 shows a typical objective, for example acting as a mapping optic of a mobile phone, comprising the lenses of FIG. 3. The objective is part of imaging device 10, which also has a cover plate/IR filter 12 between the objective and the object to be imaged. A photo sensor 13 is connected with a signal processing circuit 14 that converts the image into electronic signals. In one example the objective had an F-number of 2.88 with a focal length of 3.789 mm and a total length of the device (up to the photo chip) of 5.55 mm.

The opto-ceramic according to the invention can also be used in IR applications. Materials for these IR applications preferably have high transparency for wavelengths from 800 nm to 8,000 nm, but at least from 800 to 5,000 nm. The optical elements according to the invention may be lenses of the novel opto-ceramic, which map visible light (ca. 380 nm to ca. 800 nm) and also IR radiation up to 5,000 nm, preferably up to 7,000 nm, and most preferably up to 8,000 nm. Applications for the foregoing embodiments include windows and lenses for the so-called "forward looking Infrared", which are transmissive for infrared, for aircraft for antiballistic missile defense, cover crowns of antiballistic missiles for infrared wave lengths of up to 7,000 nm. In this case, it is particularly convenient that at the same time the material has high transmittance for both visible light and also infrared radiation. This facilitates applications in the field of defense.

Production Procedure for Opto-Ceramics of the "$X_2O_3$" Type

1. Preparation of the Powder

The production of the opto-ceramic takes place using suitable powders. Methods for preparing the powders include (co)precipitations, flame hydrolysis, gas condensation, laser ablation, plasma spray methods (CVS processes), sol-gel methods, hydrothermal methods, combustion etc. In view of high packing densities, the shape of the grain is preferably round-shaped and/or preferably spherical. The grains are only in loose contact with each other via Van der Waals forces (soft agglomerates). Ideally, the grains are connected with each other via small bridges in the form of sintering necks. In the case of chemical precipitation methods, there is a strong dependency of grain fraction and grain shape on the precipitation conditions. Thus a broad spectrum of different starting powders may be produced by the selection of the precipitation medium (carbonate precipitation, hydroxide precipitation, oxalate precipitations) of an e.g. nitrate or chloride solution, of e.g. yttrium nitrate and/or yttrium chloride. Powders having different qualities and starting properties (e.g. specific surfaces) may also be achieved by different drying methods of the filter cake (simple drying on air, lyophilization, azeotropic distillation). Furthermore, many additional parameters (pH value, rate of rotation of the stirrer, temperature, precipitation volume etc.) must be considered during the precipitations.

The purity of the powder is a substantial criterion. Each impurity may result in changed sintering conditions or in inhomogeneous distribution of the optical properties. Impurities may lead to the formation of liquid phases, which in the worst case may result in broad inhomogeneous grain boundary regions. However the formation of inter-granular phases (amorphous or crystalline) should be avoided, because of that differences in the refractive index may result which in the case of transmitted light may lead to scattering losses.

The use of hard agglomerates, i.e. primary particles that have formed bridges during precipitation and calcination and are thus "fused" together, is possible to a greater or lesser extent according to choice in the method. So e.g. J. Mouzon describes in a published Licenciate Thesis "Synthesis of Yb:$Y_2O_3$ Nanoparticles and Fabrication of Transparent Polycrystalline Yttria Ceramic", Lulea University of Technology, Int. No. 2005:29, that for the avoidance of intragranular pores, i.e. pores inside the grain, differential sintering is advantageous. This will be guaranteed by hard agglomerates, i.e. the primary particles within the agglomerate first are sintered into a dense state, in which remaining pores are preferably located in the grain boundary region. Those could be removed from the structure by the method of hot isostatic pressing.

Furthermore, in the production of (co)precipitated powders there is the possibility of reducing the tendency to agglomerate by the targeted addition of agents. Thus a grinding process is avoided. For that, there is the possibility of adding $NH_4OH$ before calcination of a precipitated oxalate suspension.

2. Conditioning of the Powder

The powders are processed in different ways due to the forming. Normally, the powder is ground with the aim a) to disintegrate the still present agglomerates and b) to homogenize the powder during the addition of additives. The grinding may be performed in the dry or wet state, with the latter taking place in alcoholic or aqueous media. The grinding times may be up to 24 hours, but should be selected so that no abrasion of the grinding bodies ($Al_2O_3$, $ZrO_2$) and of the lining of the grinding drum can take place. Ring scission, Attritor, ball grinders etc. are suitable as grinding mills. As a medium for example water, liquid alcohols and liquid hydrocarbons, such as heptanes or others, may be used.

The drying of the mixtures may be carried out in air at low temperatures. Most conveniently the grinding suspension is dried by the means of spray drying. In this case, granules having definite size and quality can be produced. In the case of spray drying, in which soft agglomerates are produced, the use of binders is recommended. The size of the agglomerates should not exceed 100 µm, but agglomerates with a size on the order of 10 to 50 µm are convenient and agglomerates with a size <10 µm are ideal. Also lyophilization or turbulent flow-drying are possible.

Occasionally, also additives are required, if the nanopowder and/or the nanopowder agglomerate must be pressed. For forming by casting, e.g. slip casting, pressure casting, centrifugal casting, the powder mixture has to be dispersed in suitable liquefiers. For that for example, DARVAN®, DOLAPIX™, polyaryl acids, polyacrylic acids, ammonium oxalate monohydrate, oxalic acid, sorbite, ammonium citrate or others are suitable.

For plastic forming (extruding, injection molding, heat casting), organic binders of the type polyolefin, e.g. HOSTAMOND® of the company Clariant, or catalytically degrading binders, e.g. of the type CATAMOLD® of the company BASF, must be introduced into the powder and must be homogenized in suitable form.

3. Forming

Pressing allows a quick and cheap forming.

For slip casting, the use of molds of gypsum is recommended.

4. Tempering Steps

Vacuum sintering allows the removal of open porosity from the compact powder. The vacuum conditions includes vacuums better than $10^{-3}$ mbar (=$10^{-3}$ hPa), wherein preferably pressures between $10^{-5}$ and $10^{-6}$ mbar (=$10^{-5}$ and $10^{-6}$ hPa) are used. The sintering conditions vary according to the material, wherein regimes such as T=1500° C. to 1800° C. and sintering times of between 1 and 10 hours should be mentioned.

Alternatively, sintering can be performed in specific atmospheres (He, dry or wet hydrogen, N, Ar).

In the case of vacuum sintering, it is important that the growth of the grains is not too fast and uncontrolled. The aim is not to incorporate pores into the grains. For that, e.g. the sintering temperatures can be kept very low. Optionally thereafter the sample is still opaque due to the high pore density, but the pores are closed.

The closed porosity between the grain boundaries may be pressed out of the structure by a subsequent HIP process. Exemplary conditions are 1500° C. to 1800° C., pressures between 100 MPa (1,000 bar) and 200 MPa (2,000 bar). Tempering times of between 1 and 10 hours (without heating and cooling time) are common. W or Mo, optionally also graphite, may be used as a heating element.

Argon may be used as a pressure medium. The sample may be encapsulated and/or embedded in a powder of its own kind to avoid dissolving Ar at the grain boundaries, e.g. in glass-like intermediate phases.

By the latter, discoloration by reduction of material at the surface and/or contamination of the sample with constituents of the heating elements, which are inside the furnace chamber, can be avoided. Thus "post tempering" in air is not necessary. If still required, it should be conducted in air or in oxygen. Exemplary conditions are 1 to 48 hours at up to 1400° C.

A special process can reduce intra-granular fine porosity. This process includes targeted growth of the grains, which takes place in such a manner that newly built up grain boundaries grow beyond the region of the pore volume enclosed in the grain.

For that, the sample is again subjected to a sintering process after the HIP process.

A combined process of "vacuum hot pressing" may also be used instead of vacuum sintering and the subsequent HIP process.

EXAMPLE

High purity $Y_2O_3$, $La_2O_3$ and $HfO_2$ powders were used as starting materials. The powders were mixed with additives and binders and ball milled for 12 h in ethanol. Then the alcohol solvent was removed by drying the milled slurry on a hot plate. The so-obtained powder was pressed with low pressure into required shapes in a metal mold and then cold isostatically pressed at 98 MPa.

Transparent $Y_2O_3$ ceramics were obtained after sintering under vacuum ($1 \times 10^{-3}$ Pa) at 1700° C. for 3 h followed by hot isostatic pressing at 1780° C. for 2 h at a pressure of 196 MPa in Ar atmosphere.

The interaction of light with an optically transparent material is the summation of the reflection, absorption, scattering and specular transmission of the light by the material. Reflection losses are inherent in the material due to Snell's law. The total amount of light emerging from a material is termed "total transmittance", while the specularly transmitted portion is termed "in-line transmittance" ($T_{in\text{-}line}$) after taking into account scattering as a possible loss mechanism.

$$T_{in\text{-}line} = I_{in\text{-}line}/I_0 = 10^{-(kin\text{-}line)t},$$

in which $I_{in\text{-}line}$ and $I_0$ are the specularly transmitted intensity leaving the sample and the incident intensity, respectively, and kin-line is the absorption coefficient. A graphic representation can be seen from FIG. 5.

Figure 5:
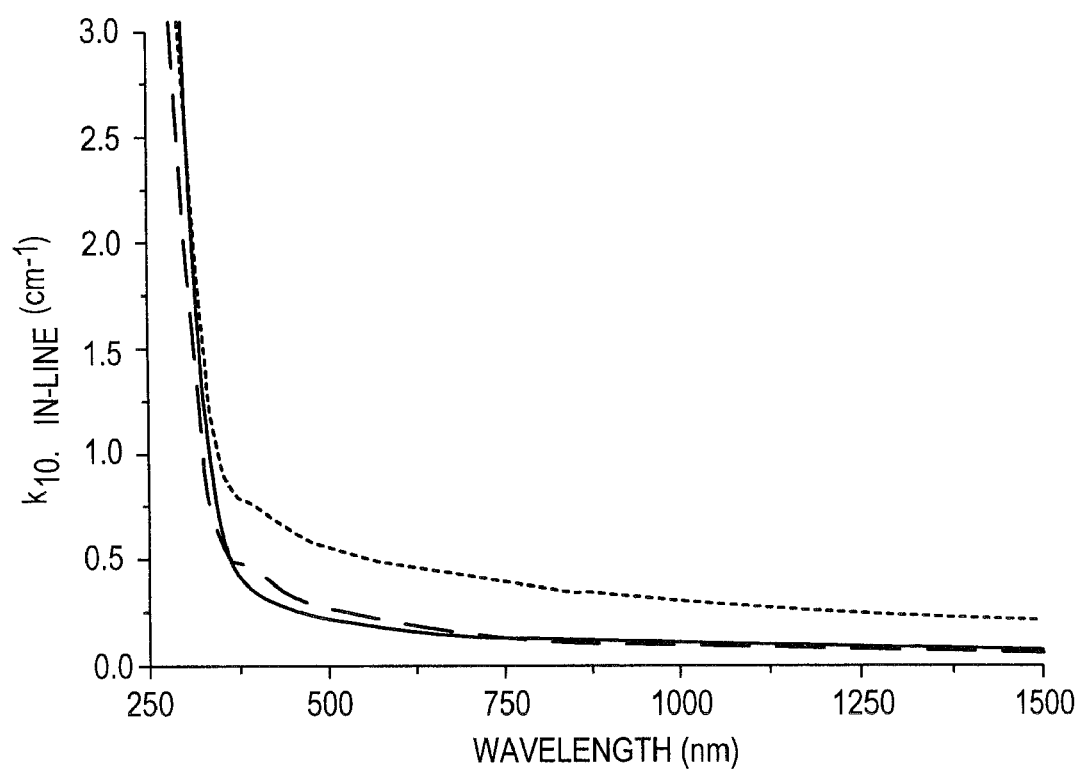
FIG. 5 is a graphical illustration showing the dependence of absorption on wavelength for several different opto-ceramics comprising $Y_2O_3$ with varying amounts of $La_2O_3$ added.

All prepared samples were transparent. The samples containing few to no $La_2O_3$ showed a yellow coloration. In FIG. 5 the linear absorption of $Y_2O_3$ opto-ceramics containing different amounts of $La_2O_3$ is graphically illustrated. Clearly a broad absorption band at ~400 nm is seen for the opto-ceramics containing 0 and 0.7 mole % $La_2O_3$. Surprisingly the sample with ~10 mole % $La_2O_3$ does not show this yellow coloration, transmitting in the UV-VIS absorption diagram and not showing any absorption band in the visible.

Therefore $La_2O_3$ has been shown to promote transmission and thus optical quality for lens applications.

LIST OF REFERENCE CHARACTERS

1 Biconvex lens
2 Biconcave lens
3 Substrate
4 Spherical lens
10 Imaging device
11 Casing
12 Cover plate/IR filter
13 Photo sensor
14 Signal Processing Circuit
15 Support plate While the invention has been illustrated and described as embodied in opto-ceramics made from $In_2O_3$ or oxides of Y, Lu, Sc, Yb, In, Gd and La, optical elements made therefrom, and mapping optics including the optical elements, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An opto-ceramic comprising a mixture of two or more oxides of the type $X_2O_3$ with X being selected from the group consisting of Y, Sc, Yb, In and Gd, said opto-ceramic comprising a crystal combination in which individual single crystallites have a cubic structure of the type $Y_2O_3$ and said opto-ceramic being transparent to visible light and transparent to infrared radiation;
   wherein said opto-ceramic is free of each of Pr, Nd, Sm, Eu, Tb, Dy, Ho, Er and Tm, said opto-ceramic has a transparency to said visible light of greater than 80 percent at a layer thickness of 2 mm and said opto-ceramic has a transparency to said infrared radiation of greater than 80 percent at a layer thickness of 2 mm.

2. The opto-ceramic according to claim 1, in which said X is selected from the group consisting of Sc, In and Gd.

3. The opto-ceramic according to claim 1, in which said mixture of said oxides is selected from the group consisting of mixtures of yttrium oxide with scandium oxide, mixtures of yttrium oxide with indium oxide, mixtures of scandium oxide with ytterbium oxide, mixtures of scandium oxide with indium oxide, mixtures of scandium oxide with gadolinium oxide, mixtures of ytterbium oxide with indium oxide, mixtures of ytterbium oxide with gadolinium oxide, mixtures of indium oxide with gadolinium oxide, mixtures of yttrium oxide with ytterbium oxide in which the ytterbium oxide is present in an amount of higher than 20% by mol and mixtures of yttrium oxide with gadolinium oxide in which the gadolinium oxide is present in an amount of higher than 20% by mol.

4. The opto-ceramic according to claim 1, further comprising $ZrO_2$ and/or $HfO_2$.

5. The opto-ceramic according to claim 1, having a refractive index greater than or equal to 1.80 and an Abbe number greater than 30.

6. The opto-ceramic according to claim 1, having a refractive index between 1.85 and 2.05 and an Abbe number between 30 and 45.

7. The opto-ceramic according to claim 1, having an Abbe number between 30 and 42 and a relative partial dispersion between 0.56 and 0.58.

8. The opto-ceramic according to claim 1, in which three or more of said oxides are present as an oxide mixture.

9. The opto-ceramic according to claim 1 which is transparent for said visible light.

10. The opto-ceramic according to claim 1, which is transparent for said infrared radiation.

11. The opto-ceramic according to claim 1, which is transparent for said visible light and said infrared radiation.

12. A refractive, transmissive, or diffractive optical element comprising an opto-ceramic, as defined in claim 1.

13. A mapping optic comprising at least two lenses of at least two different transparent materials, as defined in claim 1.

14. The mapping optic according to claim 13, in which said at least two lenses are only refractive.

15. The mapping optic according to claim 13, in which at least one of said lenses has diffractive structures.

16. The mapping optic according to claim 13, in which at least one of said lenses is made of glass.

17. The mapping optic according to claim 16, in which the lenses made of the glass and of the opto-ceramic have respective partial dispersions that are approximately similar to one another and an Abbe number difference that is greater than 10.

18. The mapping optic according to claim 16, in which the lenses made of the glass and of the opto-ceramic have respective partial dispersions that differ by less than 10%.

19. The mapping optic according to claim 16, in which the lens made of the opto-ceramic has a relative partial dispersion between 0.56 and 0.58 and an Abbe number between 30 and 40 and the lens made of the glass has a relative partial dispersion between 0.555 and 0.585 and an Abbe number lower than 45.

20. The mapping optic according to claim 16, in which the lens made of the ceramic has a relative partial dispersion in a range of between 0.56 and 0.58 and an Abbe number in a range of between 30 and 40 and the lens made of the glass has a relative partial dispersion of between 0.555 and 0.575 and an Abbe number less than 50.

21. The mapping optic according to claim 16, in which said glass is selected from the group consisting of N-BAF4, N-BAF10, N-SSK8, N-SSK5, N-KF9, LLF1, TiF1, TiF2 and glasses having optical positions that are comparable to those of the foregoing.

22. The mapping optic according to claim 13, wherein said lenses are arranged to form a compact objective having a predetermined focal length.

23. The mapping optic according to claim 13, wherein a first lens, which is arranged on a side closest to an object to be imaged, is a purely refractive lens.

24. The mapping optic according to claim 14, wherein the first lens, which is arranged on a side closest to an object to be imaged, is a spherical lens.

* * * * *